United States Patent [19]

Ando et al.

[11] Patent Number: 4,802,738
[45] Date of Patent: Feb. 7, 1989

[54] INTERMEDIATE OPTICAL DEVICE

[75] Inventors: Makoto Ando; Hiroshi Kojima, both of Sakai, Japan

[73] Assignee: Minolta Camera Kabushiki Kaisha, Japan

[21] Appl. No.: 19,857

[22] Filed: Feb. 26, 1987

[30] Foreign Application Priority Data

Feb. 26, 1986 [JP] Japan ................................ 61-42475

[51] Int. Cl.⁴ .......................... G02B 7/02; G03B 3/00
[52] U.S. Cl. .................................... 350/257; 354/402; 354/286
[58] Field of Search ................ 350/257, 252; 354/286, 354/295, 400, 402

[56] References Cited

U.S. PATENT DOCUMENTS

| 4,336,991 | 6/1982 | Isobe | 357/257 |
| 4,372,663 | 2/1983 | Oshima | 350/257 |
| 4,420,239 | 12/1983 | Yasuyuki et al. | 350/257 |
| 4,466,019 | 8/1984 | Sakashita | 354/286 |
| 4,548,488 | 10/1985 | Honda et al. | 354/402 |
| 4,627,699 | 12/1986 | Takagi | 354/400 |

Primary Examiner—Bruce Y. Arnold
Assistant Examiner—Loha Ben
Attorney, Agent, or Firm—Wolder, Gross & Yavner

[57] ABSTRACT

A converter lens interposed between a camera body and an interchangeable lens and having an engagement means at each of the front and rear ends thereof to prevent interconnection with another converter lens. The interconnection of converter lenses are prevented by the engagement of the engagement means at the front end of one converter lens with the engagement means at the rear end of the other converter lens, thereby preventing any increase in mechanical exposure error.

12 Claims, 7 Drawing Sheets

INTERMEDIATE OPTICAL DEVICE

BACKGROUND OF THE INVENTION

1. Field of the Invention

This invention relates to improvements in an intermediate optical device interposed removably between a camera body and an interchangeable lens.

2. Description of the Prior Art

Conventionally, intermediate optical devices of the subject type include an extension ring which is constructed so as to take a close-up photograph by increasing the amount of working separation between an interchangeable lens and the film, and a rear converter which includes an inside lens and is constructed so as to change the focal length by combining the inside lens with the interchangeable lens. Each of these intermediate optical devices includes a rear end mount connected to a camera body by a relative turning operation, and a front end mount connected to the interchangeable lens by a relative turning operation so as to be adapted to be inserted removably between the camera body and the interchangeable lens. Most of them include an automatic diaphragm interlock mechanism which mechanically couples the automatic diaphragm stopping down mechanism of the camera body and the diaphragm stopping down mechanism of the interchangeable lens corresponding to the automatic exposure function of the camera.

Recently, a camera having an automatic focusing mechanism has appeared. This results in an intermediate optical device which includes an automatic focusing interlock mechanism which mechanically couples a drive output shaft connected to a motor within the camera body to a follower shaft to operate the focusing lens within the interchangeable lens.

However, an intermediate device including an automatic mechanical diaphragm interlock mechanism, as mentioned above, produces more or less "play" and/or "deflection" in the interlock mechanism. If such device is interposed between the camara body and the interchangeable lens, it cannot avoid a slight decrease in the accuracy of the diaphragm aperture due to a decrease in the positional accuracy and dynamic characteristics of the respective components constituting the interlock mechanism. The inertia of the interlock mechanism will produce some delay in the diaghragm stopping down operation. These decreases in accuracy cannot be completely eliminated. Thus in design, manufacturing accuracy is established at a predetermined level sufficient for achieving an exposure error within a predetermined tolerance such as the film latitude on the assumption that only one such intermediate optical device is interposed. However, if the user interposes between the camera body and the interchangeable lens a plurality of interconnected intermediate optical devices against the designer's intention, a decrease in the accuracy of the diaphragm aperture and a delay in the diaphragming operation would increase accumulatively and the exposure error would exceed the desired tolerance.

If a plurality of intermediate optical devices including an automatic mechanical focusing interlock mechanism, as described above, are interconnected, a problem in strength occurs in that the automatic focusing interlock mechanism and its driving system are overloaded thereby being damaged.

This invention contemplates the above problems. It is an object of this invention to provide an intermediate optical device which can be freely coupled to the camera body and/or the interchangeable lens, but prevents an erroneous interconnection of a plurality of intermediate optical devices even if it is attempted.

SUMMARY OF THE INVENTION

In order to achieve such object, this invention provides an intermediate optical device comprising a rear end mount coupled to the camera body by relative turning operation, a front end mount coupled to the interchangeable lens by relative turning operation, the device being interposed removably between the camera body and the interchangeable lens, characterized by a first engagement unit and a second engagement unit provided at the rear and front ends of the device, and engaged with each other at a position where the interconnection of the intermediate optical devices would start or at a position in the course of the interconnection.

According to the above structure, even if the interconnection of intermediate optical devices may be erroneously attempted by their relative turning operation, the first engagement means provided at the rear end of one intermediate optical device is engaged with the second engagement means provided at the front end of the other intermediate optical device at the position where the coupling operation starts in the direction in which the intermediate optical devices abut, or at a position in the course of the turning operation in the direction in which the devices turn to thereby stop the interconnection at the beginning thereof or in the course thereof, so that completion of the interconnection becomes impossible, namely, the interconnection of the devices is prevented. Thus it is impossible to complete the interconnection, so that it is ensured that relative interconnection of two or more intermediate optical devices will be prevented. Therefore, only one intermediate optical device is accepted necessarily between the camera body and the interchangeable lens, so that the problem that a decrease in the accuracy of the diaphragm and a delay in the stopping down movement would increase accumulatively and the exposure error would exceed a desired tolerance, and the problem in strength that a large load acting on the automatic focusing interlock mechanism and its drive system would damage same can be eliminated.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE INVENTION

DETAILED DESCRIPTION OF THE PREFERRED EMBODIMENT

An embodiment of this invention will be now described with reference to the drawings.

Figure 1:
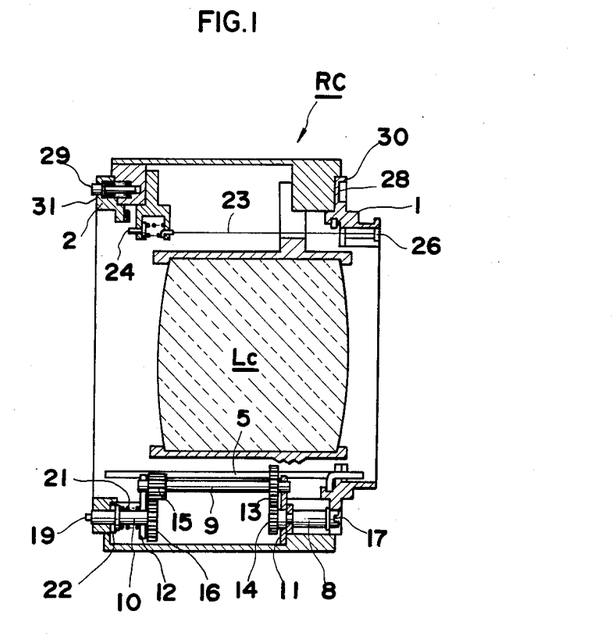
FIG. 1 is a diagramatic cross-sectional view showing an intermediate optical device which is one embodiment of this invention.

FIG. 1 showing a diagrammatic cross-sectional view is approximately modified in cross section so that all the essential portions of this device are shown. A rear converter RC includes a rear converter lens system LC therein and has a rear end mount 1 which includes a bayonet mount member at its rear end (the right end in FIG. 1) and a front end mount 2 which includes a bayonet mount seat plate at the front end (the left end in FIG. 1) of the converter RC. This rear converter RC is interposed removably between the camera body CB and the interchangeable lens EL by a relative turning with the rear and front end mounts 1 and 2 abutting against members 3 and 4 of the camera body CB and interchangeable lens EL, respectively.

Figure 11:
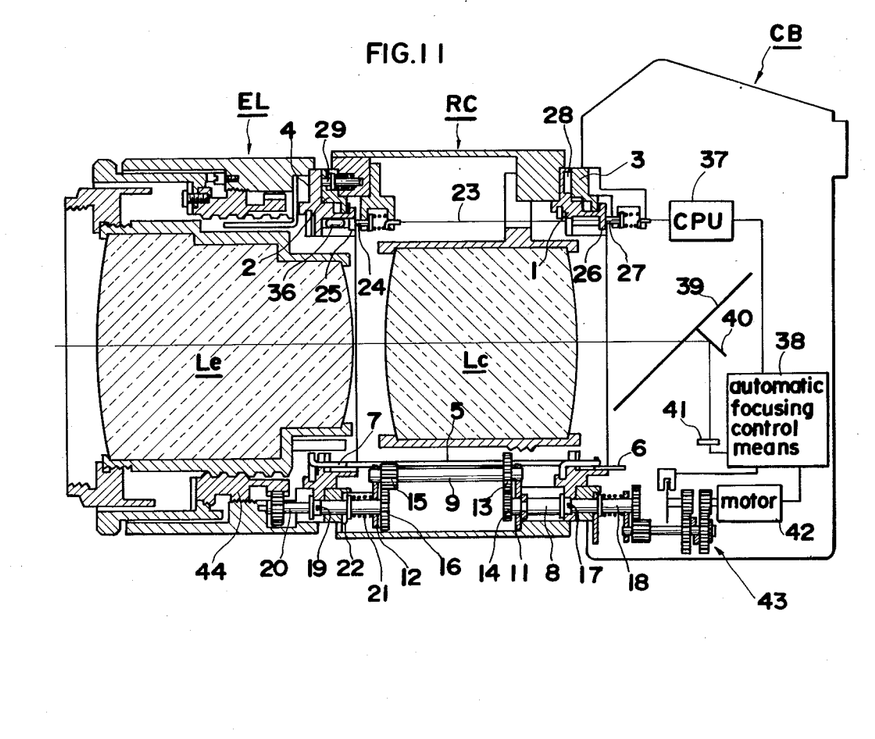
FIG. 11 is a diagrammatic cross-sectional view of the intermediate optical device as the first embodiment of this invention interposed between the camera body and the interchangeable lens.

An intermediate bar 5 constituting a part of the automatic diaphragm interlock mechanism is provided inside the rear converter RC. The bar 5 is movable along the inside periphery of the rear converter RC from the position where the diaphragm mechanism (not shown) of the interchangeable lens EL is opened, namely, the diaphragm opening position 5' shown by the broken line in FIG. 2, to the position where the diaphragm mechanism is stopped down, namely, the diaphragm stop down position as shown by the solid line. The rear end of the bar 5 is engaged with a diaphragm drive lever 6 of the camera body CB, as shown in FIG. 11, and the front end of the bar 5 is engaged with a diaphragm lever 7 of the interchangeable lens EL.

Provided inside the rear converter RC are intermediary follower shaft 8, an intermediate shaft 9 and an intermediary drive output shaft 10 constituting the automatic focusing interlock mechanism. The shaft 8 is journaled in the rear end mount 1 and in a bearing plate 11. The output shaft 10 is journaled in the front end mount 2 and in a bearing plate 12 coaxially with the follower shaft 8. The intermediate shaft 9 is journaled in bearing plates 11, 12 non-coaxially with shafts 8 and 10. A gear 13 at the rear end of the shaft 9 meshes with a gear 14 at the front end of the shaft 8 while a gear 15 at the front end of the shaft 9 meshes with a gear 16 at the rear end of the shaft 10, so that the shafts 8, 9, 10 are coupled. The shaft 8 has a coupling recess 17 at its rear end. Thus when the shaft 8 is mounted on the camera body CB, as shown in FIG. 11, the coupling recess 17 is engaged with a coupling protrusion at the front end of a drive shaft 18 of the camera body CB to thereby accomplish coupling between the shafts 8 and 18. The intermediary drive output shaft 10 has a coupling protrusion 19 at its front end which is engaged with a coupling recess provided at the rear end of a follower shaft 20 of the interchangeable lens EL when mounted on the interchangeable lens EL to thereby accomplish coupling between the shafts 10 and 20. The output shaft 10 is normally biased so as to protrude forwardly by a coil spring 21.

When an interlock plate 22 connected to the shaft 10 is moved backward against the action of the coil spring 21 by operating a coupling release button (not shown), the shaft 10 is fully retracted into the front end mount 2.

Provided in the rear converter RC is a conductor 23 as a signal transmission means which transmits an information signal inherent to the interchangeable lens EL to a focusing control means of the camera body CB. The conductor 23 has a plurality of movable contact pins 24 at its front end which resiliently contact with a plurality of fixed contact plates 25 of the interchangeable lens EL, as shown in FIG. 11, while a plurality of fixed contact plates 26 at the rear end of the conductor 23 resiliently contact a plurality of movable contact pins 27 of the camera body CB.

Figure 2:
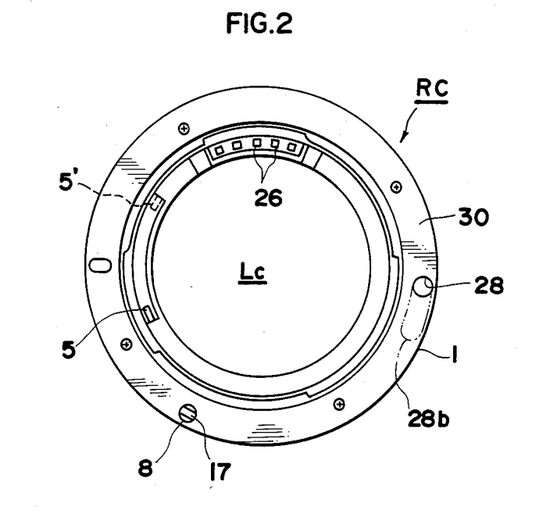
FIG. 2 is a rear view of the device.
Figure 4:
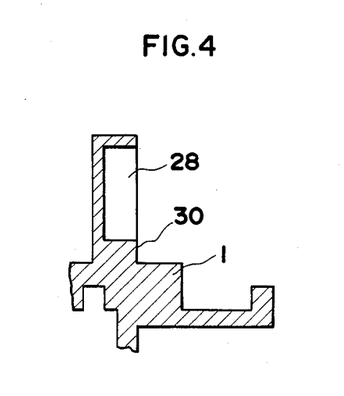
FIGS. 4 and 5 are enlarged cross-sectional views of essential portions of the device.
Figure 5:
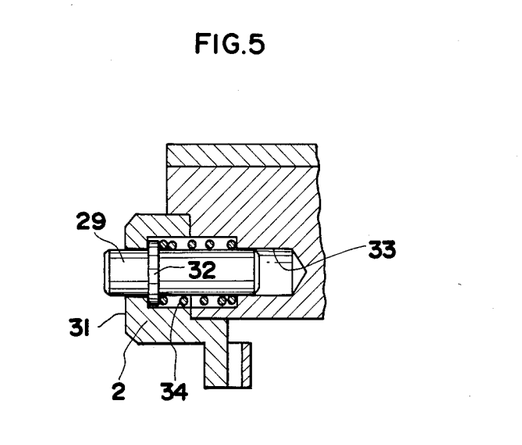

A first engagement member 28 and a second engagement member 29 featuring the present invention are provided at the rear and front end mounts 1 and 2, respectively, of the rear converter RC. First engagement member 28 includes a circular engagement hole, as shown in FIG. 2, provided in a flange surface 30 of the rear end mount 1, as shown in FIG. 4. The second engagement member 29 includes an engagement pin or detent, the forward end of which protrudes from a flange surface 31 of the front end mount 2. The engagement pin constituting the second engagement member 29 has a collar 32 in the intermediate portion thereof, as shown in FIG. 5, and is slidably held in a hold hole 33. It is normally biased so as to protrude forwardly (to the left in FIG. 1) by a coil spring 34 entrapped between collar 32 and a step portion of hold hole 33. It is to be noted that the engagement hole constituting the first engagement member 28 is larger in diameter than the engagement pin constituting the second engagement member 29.

Figure 3:
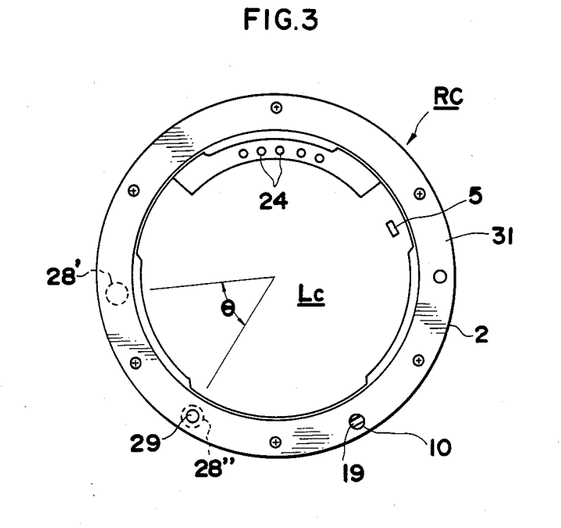
FIG. 3 is a front view of the device.

The first and second engagement members 28 and 29 are disposed in opposing relationship at a first abutment position i.e. a position where the interconnection starts when a pair of the rear converters RC are interconnected by their relative turning operation. In FIG. 3, reference numeral 28' shows the position of the first engagement member 28 when the rear converter RC is viewed from its front. In other words, it shows an imaginary position of the first engagement member 28 of the other rear converter RC when interconnection is assumed to have been completed by causing the front end mount 2 of that rear converter RC and the rear end mount 1 of the other rear converter RC to abut against each other and then turning them by a predetermined angle θ.

When the interconnection starts, the first engagement member 28 of the other rear converter RC is at an imaginary position 28''. Thus in the rear converter RC of this embodiment, the second engagement member 29 is provided so as to coincide with the position 28'', as shown in FIG. 3, so that the first engagement member 28 of the rear converter RC and the second engagement member 29 of the other rear converter RC oppose each other at the position where the interconnection of the rear converter RC starts.

Since the camera body CB and the interchangeable lens EL include a protrusion and a coupling recess, respectively, for coupling with each other thereby positioning the camera body CB and the lens EL, the first and second engagement means 28 and 29 are provided at positions where they do not interfere with the coupling recess and the protrusion when they are coupled to the camera body CB and the interchangeable lens EL by relative turning operation of the rear and front end mounts 1 and 2 of the rear converter RC.

Figure 7:
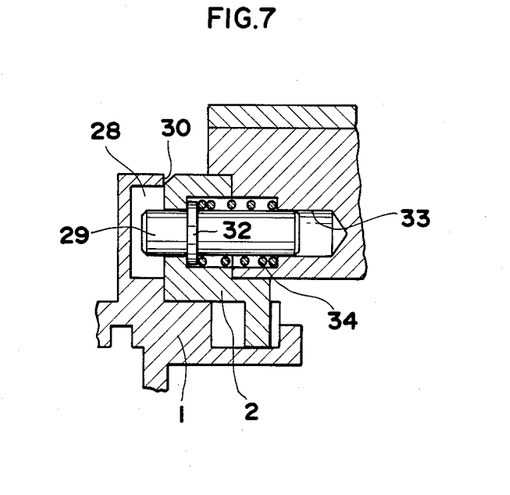
FIG. 7 is an enlarged cross-sectional view of the essential portion showing a pair of the devices which abut against each other.

When the front end mount 2 of one rear converter is caused to abut against the rear end mount 1 of the other rear converter, as shown in FIG. 7, in an attempt to erroneously interconnect rear converters RC, the second engagement member (engagement pin) 29 is fitted into the first engagement member (engagement hole) 28 at the position where the mounts abut against each other i.e. the position where the interconnection starts. In this case, the first engagement member 28 is a circular hole large enough in size compared with the second engagement member 29, so that even if the angular position where the rear and front end mounts 1 and 2 abut is slightly offset from a predetermined position, it is ensured that the front end of the second engagement member 29 is fitted to the first engagement member 28. By such fitting, the outer surface of the second engagement member 29 is engaged with the inner surface of the first engagement member 28 immediately after the relative rotation has started so that the rear converters RC are prevented from relative rotation.

Thus completion of the interconnection of both the rear converters RC becomes impossible, namely, interconnection is prevented. It is to be noted that a first engagement means including an elongated slot 28b shown by dot-dashed line in FIG. 2 may be formed which can be engaged with the second engagement 29 at a middle position in the course of the relative turning operation. In this case, interconnection can be, of course, prevented similarly.

Figure 6:
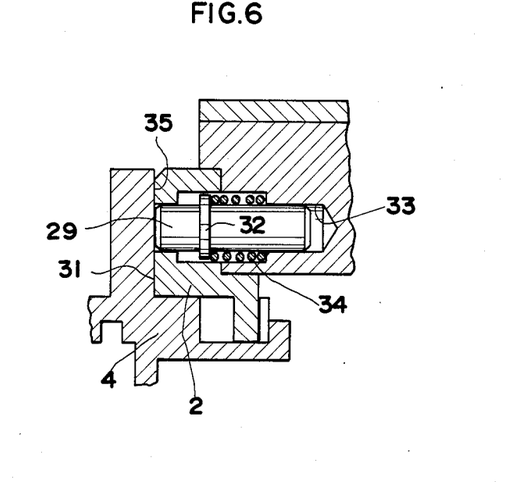
FIG. 6 is an enlarged cross-secticnal view of an essential portion showing the coupling between the device and an interchangeable lens.

On the other hand, when the front end mount 2 of rear converter RC is to be coupled to the bayonet mount member 4 of the interchangeable lens EL and when the both members are caused to abut against each other, as shown in FIG. 6, the front end of the second engagement member (engagement pin) 29 is pushed by the flange surface 35 of the bayonet mount member 4, so that the second engagement member 29 is pushed along hold hole 33 against the action of coil spring 34. Thus the second engagement member (engagement pin) 29 does not prevent the rear converter RC and the interchangeable lens EL from rotating relative to each other to the end so as to be coupled to each other. Also, when the rear end mount member 1 of the rear converter RC is coupled to the bayonet mount seat plate 3 of the camera body CB, the first engagement member (engagement hole) 28 is not prevented fom moving, so that the rear converter RC and the camera body CB are turned relative to each other so as to be coupled to each other.

In this way, when the rear converter RC is removably inserted between the camera body CB and the interchangeable lens EL, movable contact pins 24 of the conductor 23 and fixed contact plates 26 within the rear converter RC resiliently contact the fixed contact plates 25 of the interchangeable lens EL and the movable contact pins 27 of camera body CB, respectively, as shown in FIG. 11, so that an information signal generated by a ROM 36 within the interchangeable lens from a coefficient for calculating the amount of movement of the follower shaft 20 from the amount of focus is transmitted to an automatic focusing control means 38 through the conductor 23 in the rear converter RC and a CPU 37 in the camera body. The control means 38 also receives a signal from a detector means 41 which detects the focusing state by receiving light passing through a central transparent portion of a main movable mirror 39 within the camera body CB and reflected by a submirror 40. The control means 38 controls the direction and quantity of the movement of a motor 42 on the basis of those input signals.

On the other hand, by insertion of the rear converter RC, the coupling recess 17 in the follower shaft 8 and the coupling projection 19 of the drive output shaft 10 within the rear converter RC are coupled to the coupling protrusion of the drive shaft 18 of camera body CB and the follower shaft 20 of the lens EL, respectively, so that when the motor 42 is controllably driven, as described above, a helicoid screw member 44 within the interchangeable lens EL is controllably rotated via a transmission gear train 43 and the drive output shaft 18 within the camera body CB, and the follower shaft 8, the intermediate shaft 9 and the drive output shaft 10 within the rear converter RC and further via the follower shaft 20 within the interchangeable lens EL. This causes a focusing lens system Le within the interchangeable lens EL to be moved forwardly or backwardly by a predetermined amount to thereby perform automatic focusing.

By insertion of the rear converter RC, the front and rear ends of the intermediate bar 5 are engaged with the diaphragm lever 7 of the interchangeable lens EL and the diaphragm drive lever 6 of the camera body CB, respectively, so that the diaphragm drive lever 6 is controllably driven by the diaphragm control means (not shown) within the camera body CB and the diaphragm lever 7 is similarly operated via intermediate bar 5 to thereby stop down the diaphragm mechanism automatically within the interchangeable lens EL by a predetermined amount.

Figure 8:
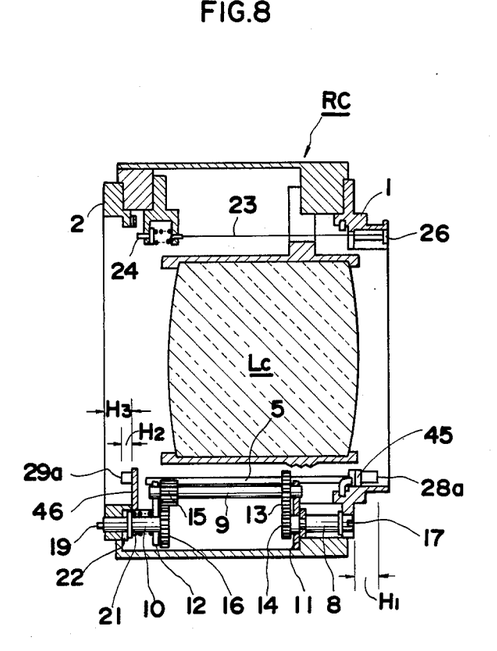
FIG. 8 is a digrammatic cross-sectional view showing an intermediate optical device as another embodiment of this invention.
Figure 9:
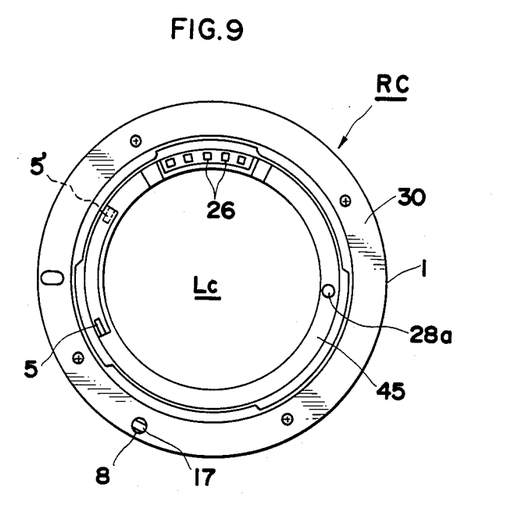
FIG. 9 is a rear view of the device.
Figure 10:
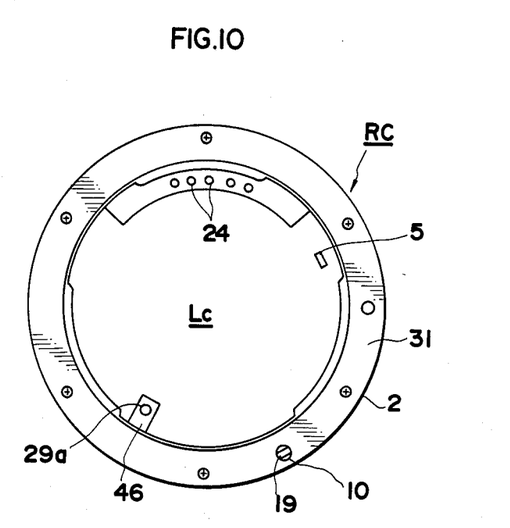
FIG. 10 is a front view of the device.

In FIGS. 8, 9 and 10 showing another embodiment of this invention, the first and the second engagement means 28a and 29a of a rear converter RC are different from those of the previous embodiment.

In more detail, as shown in FIGS. 8 and 9, the first engagement means 28a includes a columnar engagement protrusion which is provided so as to protrude rearwardly from an inner collar surface 45 of a rear end mount 1. Also, as shown in FIGS. 8 and 10, the second engagement means 29a includes a columnar engagement protrusion provided so as to protrude forwardly from a mounting piece 46 protruding inwardly from the inner peripheral surface of a front end mount 2. The relationship in disposition between the first and the second engagement means 28a and 29a is similar to that in the previous embodiment. Namely the first and the second engagement means are opposite to each other at a position where the interconnection starts, namely, at a position where the rear converters RC abut against each other, when the converters RC are to be interconnected by their relative turning operation. The sum of the protruding dimension H1 of the first engagement means 28a and the protruding dimension H2 of the second engagement means 29a are set so as to be greater than the dimension H3 from the front end opening surface of the front end mount 2 to the mounting piece 46 (in other words, the dimension from the rear end opening surface of the rear end mount 1 to the inner collar surface 45). Other structural portions are similar to those of the previous embodiment, so that a duplicate description will be omitted and like reference numerals are only given to components in FIGS. 8 to 10 similar to those in the previous Figures.

When the rear end mount 1 is to be coupled to the bayonet mount seat plate 3 of the camera body CB, the rear converter RC having such structure and the camera body CB are turned relative to each other to the end so as to be coupled to each other as in the prior art because the first engagement means (the engagement protrusion) 28a is not interrupted in its movement. When the front end mount 2 is to be coupled with the bayonet mount member 4 of the interchangeable lens EL, the rear converter RC and the interchangeable lens EL are turned relative to each other to the end so as to be coupled to each other as in the prior art because the second engagement means (engagement protrusion) 29a is not interrupted in its movement. However, when the rear end mount 1 of one rear converter is caused to abut against the front mount 2 of another similar rear converter in an attempt to erroneously interconnect the rear converters RC, the rear end surface of the first engagement means and the front end surface of the second engagement means are engaged with each other at the position where the end mounts 1 and 2 abut each other, namely, where the coupling operation starts to thereby prevent interconnection, so that the mounts 1 and 2 cannot abut each other to the end.

While an intermediate optical device of the present invention has been described by taking a rear converter as an example, of course, this invention is also applicable to all the intermediate optical devices, such as extension rings, interposed between the camera body and the interchangeable lens, in addition to the rear converter. The shape and structure of the first and the second engagement means are not limited to those of the previous embodiments. For example, the first engagement means 28 in the first embodiment may be changed to the form of a radial groove. The first and the second engagement means 28a and 29a in the second embodiment may be engaged with each other in the course of relative turning operation in the circumferential direction. In summary, the engagement members can be formed in any shape and structure if only the members can prevent relative interconnection of the intermediate optical devices.

What is claimed is:

1. An intermediate optical device including a rear portion for interconnecting said device to a camera body and a front portion for interconnecting said device to an interchangeable lens, said device comprising:
   a rear mount surface provided on said rear portion for adusting the relative positions of said device and said camera body;
   a front mount surface provided on said front portion for adjusting the relative positions of said device and said interchangeable lens;
   a first engagement means provided on said rear mount surface; and
   a second engagement means provided on said front mount surface for engaging with an engagement means provided on another intermediate optical device so as to prevent the intermediate optical devices from interconnecting to each other.

2. An intermediate optical device as in claim 1, wherein one of said engagement means includes a projecting pin and the other of said engagement means includes a recess having a diameter larger than that of said projecting pin.

3. An intermediate optical device as in claim 2, wherein said projecting pin is retractable into one of said mount surfaces and is biased in a projecting direction.

4. An intermediate optical device as in claim 1, wherein said device is a rear conversion lens.

5. An intermediate optical device for use with a camera body and an interchangeable lens, comprising:
   a rear portion for interconnecting said device to said camera body, having an inner periphery allowing the traverse of an optical path through said rear portion;
   a front portion for interconecting said device to said interchangeable lens, having an inner periphery for allowing the traverse of the optical path through said front portion;
   a first engagement means provided inside said inner periphery of said rear portion;
   a second engagement means provided inside said inner periphery of said front portion for engaging with an engagement means provided on another intermediate optical device so as to prevent the intermediate devices from full mutual intercoupling.

6. An intermediate otioal devioe as in claim 5 further comprising means for transmitting an automatic diaphragm stop down movement from said camera body to said interchangeable lens.

7. An intermediate optical device as in claim 6 further comprising means for transmitting an automatic focusing movement from said camera body to said interchangeable lens.

8. An intermediate optical device as in claim 5, wherein said device is a rear conversion lens.

9. An extension device insertable between a camera body having a rotary front coupling on a front wall thereof and an interchangeable lens having a rotary rear coupling complementing and releaseably engageable with said camera body coupling, said extension device including
   a rotary front coupling complementing and releaseably engageable with said interchangeable lens coupling and having a front forwardly facing annular positioning surface;
   and a rotary rear coupling complementing and releaseably engageable with said camera body coupling and having a rear rearwardly facing annular positioning surface;
   and characterized by having a coupling prevention means including a recess formed in one of said positioning surfaces and an outwardly biased retractable detent disposed in the other of said positioning surfaces, the detent on the extension device engaging the recess in another similar extension device in end-to-end engagement therewith to prevent the relative rotation thereof to full coupling positions.

10. The extension device of claim 9 wherein said camera body includes a diaphragm drive and said interchangeable lens includes a diaphragm adjusting member, said extension device including a motion transmission separable drive coupling said diaphragm drive and said diaphragm adjusting member.

11. The extension device of claim 9 wherein said camera body includes a focusing drive and said interchangeable lens includes a lens focusing member, said extension device including a rotational motion transmission separable drive coupled between said focusing drive and said lens focusing member.

12. The extension device of claim 9, wherein said coupling prevention means includes stop fingers projecting radially inwardly from the front and rear peripheries of said device.

* * * * *